March 4, 1924.
C. P. BREESE
CLUTCH
Filed Dec. 3, 1920
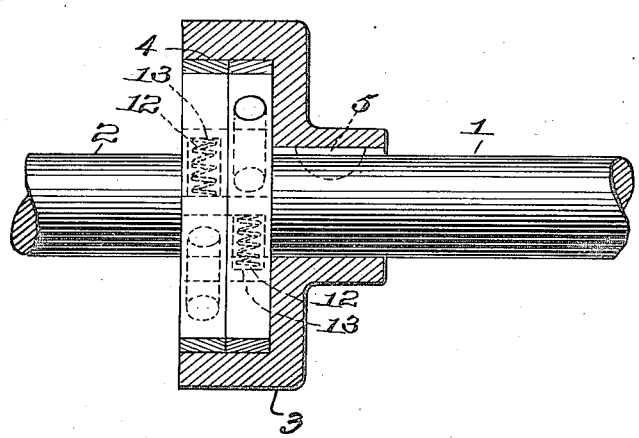
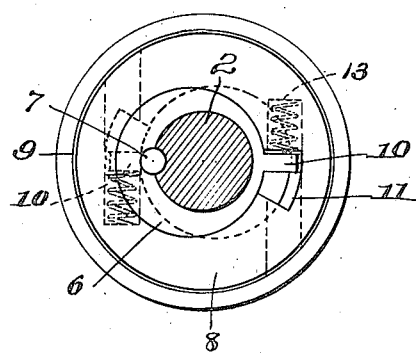

Patented Mar. 4, 1924.

1,485,761

UNITED STATES PATENT OFFICE.

CHARLES P. BREESE, OF DAYTON, OHIO.

CLUTCH.

Application filed December 3, 1920. Serial No. 482,122.

*To all whom it may concern:*

Be it known that I, CHARLES P. BREESE, a citizen of the United States, residing at Dayton, in the county of Montgomery and State of Ohio, have invented certain new and useful Improvements in Clutches, of which the following is a specification.

This invention relates to clutches and particularly to devices of this kind known in the art as "over-running clutches."

The object of the invention is to produce a practical over-running clutch, which will become instantaneously effective when the driving shaft is rotated in one direction and the clutch action instantaneously released when the direction of rotation of the driving shaft is reversed, the improved clutch also releasing instantaneously when the functions of the driving and driven shafts are interchanged, while maintaining the same direction of rotation. A further object of the invention is to produce a clutch of the type above referred to, which is accurate, reliable and positive in operation, which may be manufactured with the greatest precision and accuracy, and also economically, and which may be also manufactured in quantity production, without sacrificing accuracy and efficiency.

With the above and other objects in view, the invention consists in the novel construction, combination and arrangement hereinafter fully described, illustrated and claimed.

In the accompanying drawings:

Figure 1 is a face view of the improved clutch.

Figure 2 is a diametrical section through the clutch, showing the driving and driven shafts in elevation.

In order to illustrate the improved clutch and the operation thereof, I have shown clutch mechanism applied to and used in conjunction with a driving shaft 1 and driven shaft 2. It will, however, become apparent as the description proceeds that the function of said shafts may be reversed, the driving shaft becoming the driven shaft and the driven shaft becoming the driving shaft. Mounted on and in fixed relation to the driving shaft 1 is a clutch member 3, hereinafter designated the "outer clutch member," the same having an internal working or clutch face 4, which is concentric with the axes of the shafts 1 and 2. The clutch member 3 is shown, for convenience, as mounted upon and in fixed relation to the driving shaft 1, by means of a key 5, although it will be apparent that any means may be employed for fastening the clutch member 3 to its shaft. In some cases the clutch member 3 may constitute an integral part of the shaft 1. Mounted in fixed relation to the driven shaft 2, is an eccentric 6, the same being shown as fastened to the shaft 2, by means of a key 7, although any equivalent means may be employed to fasten said parts together. Interposed between the eccentric 6 and the working face 4 of the clutch member 3, is another clutch member 8, hereinafter termed "inner clutch member." Clutch member 8 has an outer peripheral working or clutch face 9, which contacts with the clutch face 4 above referred to, both of said clutch faces 4 and 9 being concentric to the axes of the shafts 1 and 2. The eccentric 6 has projecting radially therefrom a lug or shoulder 10, which is adapted to play back and forth in an arcuate path within a curved slot 11 in the clutch member 8, as shown in Figure 1. One end of an expansion spring 12 bears against the shoulder 10, while the other end of said spring bears against the inner wall or end of a recess 13, formed in the clutch member 8, as indicated by dotted lines in the drawings.

In the preferred embodiment of this invention, two inner clutch members 8 are employed in conjunction with the single outer clutch member 3, as shown in Figure 2, and as illustrated in dotted lines, the shoulder 10 of one inner clutch member 8 is located diametrically opposite the corresponding shoulder of the other clutch member 8. It will be obvious that one, two or more inner clutch members 8 may be employed and that the shoulders 10 and springs 12 may be equally distributed or arranged equi-distantly from each other to obtain more or less fineness of adjustment and regulate the working conditions or qualities of the clutch to the work to be performed and in accordance with the load or stress imposed on the clutch mechanism.

Power being applied to the driving shaft 1 in a clockwise direction, facing the clutch from that end, the springs 12 force the inner clutch members 8 to rotate slightly upon and around the eccentric 6 in the same direction as the driven shaft is rotated, which makes the outside surface of the inner clutch members 8 come in contact with the inside working clutch face of the clutch member 3, the resulting friction causing a clutching action. Should the direction of the rotation of the shaft 1 be reversed or should the power be applied to the shaft 2 instead of shaft 1, then the springs 12 force the inner clutch members 8 to rotate on the outside of the eccentric 6 in the opposite direction to the rotation of the driven shaft and the clutch action is released. As shown in the drawings, the clutch engagement points are located 180 degrees apart. Where four inner clutch members are employed, there will be four clutching points and they will then be located preferably 90 degrees apart.

I claim:

1. In a clutch, a driving shaft, a driven shaft in axial alinement with the driving shaft, an eccentric fast on the driven shaft having a working face of true circular formation, an annular outer clutch member fast on the driving shaft and having an internal clutch face of true circular formation concentric with the axes of said shafts, an inner clutch member having a clutch face of true circular formation to coact with said internal clutch face and also having an eccentric opening therein in which said eccentric works, and means within said inner clutch member for effecting relative rotative movement between said inner clutch member and said eccentric to cause a clutching action between said outer and inner clutch members.

2. In a clutch, a driving shaft, a driven shaft in axial alinement with the driving shaft, an eccentric fast on the driven shaft having a working face of true circular formation, an annular outer clutch member fast on the driving shaft and having an internal clutch face of true circular formation concentric with the axes of said shafts, an inner clutch member having a clutch face of true circular formation to coact with said internal clutch face and also having an eccentric opening therein in which said eccentric works, and yieldable means housed within said inner clutch member and coacting with said eccentric to cause a clutching action between said outer and inner clutch members.

3. In a clutch, a driving shaft, a driven shaft in axial alinement with the driving shaft, an eccentric fast on the driven shaft having a working face of true circular formation, an annular outer clutch member fast on the driving shaft and having an internal clutch face of true circular formation concentric with the axes of said shafts, an inner clutch member having a clutch face of true circular formation to coact with said internal clutch face and also having an eccentric opening therein in which said eccentric works, and an expansion spring housed within said inner clutch member and acting between shoulders of said inner clutch members and the eccentric to cause the outer clutch member to normally grip the inner clutch member.

In testimony whereof I have affixed my signature.

CHARLES P. BREESE.